US011514274B2

(12) United States Patent
Chen et al.

(10) Patent No.: US 11,514,274 B2
(45) Date of Patent: Nov. 29, 2022

(54) GEOGRAPHIC DATASET PREPARATION SYSTEM

(71) Applicant: Google LLC, Mountain View, CA (US)

(72) Inventors: Aiyou Chen, Palo Alto, CA (US); Timothy C. Au, San Mateo, CA (US); Nicolas Remy, Mountain View, CA (US); Kevin Benac, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 276 days.

(21) Appl. No.: 16/834,843

(22) Filed: Mar. 30, 2020

(65) Prior Publication Data
US 2021/0312221 A1 Oct. 7, 2021

(51) Int. Cl.
*G06K 9/00* (2022.01)
*G06K 9/62* (2022.01)
(Continued)

(52) U.S. Cl.
CPC ............. *G06K 9/627* (2013.01); *G06F 16/29* (2019.01); *G06K 9/6201* (2013.01);
(Continued)

(58) Field of Classification Search
CPC .... G06K 9/627; G06K 9/6201; G06K 9/6231; G06K 9/6256; G06F 16/29; G06N 20/00;
(Continued)

(56) References Cited

U.S. PATENT DOCUMENTS

| 11,109,194 B1* | 8/2021 | Pinheiro | ............... H04W 4/029 |
| 2021/0312497 A1* | 10/2021 | Chen | ................. G06Q 30/0252 |
| 2021/0357952 A1* | 11/2021 | Liu | ....................... G06Q 10/107 |

FOREIGN PATENT DOCUMENTS

| WO | WO-2011/143045 | 11/2011 |
| WO | WO-2020/013821 | 1/2020 |

OTHER PUBLICATIONS

Chen et al., "Robust Causal Inference for Incremental Return on Ad Spend With Randomized Geo Experiments", AMT, Google, Inc., Draft, Apr. 25, 2019 (31 pages).
(Continued)

*Primary Examiner* — Md K Talukder
(74) *Attorney, Agent, or Firm* — Dority & Manning, P.A.

(57) ABSTRACT

Systems, methods and computer-readable storage media utilized to prepare datasets for geo experiments. One method includes receiving one or more input parameters. The method further includes extracting, from the data, training data. The method further includes calculating a difference in input data and a difference in response data of the training data. The method further includes determining a first plurality of geographic pairs. The method further includes extracting, from the data, evaluation data. The method further includes separating each geographic pair of the first plurality of geographic pairs into a treatment region or a control region for a plurality of simulations of a plurality of different simulation subsets for each of a plurality of different subsets of geographic pairs. The method further includes calculating a plurality of uncertainty estimates. The method further includes selecting a first subset of geographic pairs and providing the selected subset of geographic pairs.

20 Claims, 5 Drawing Sheets

(51) Int. Cl.
    *G06N 20/00*     (2019.01)
    *G06F 16/29*     (2019.01)
    *G06V 10/75*     (2022.01)

(52) U.S. Cl.
    CPC ......... *G06K 9/6231* (2013.01); *G06K 9/6256* (2013.01); *G06N 20/00* (2019.01); *G06V 10/759* (2022.01)

(58) Field of Classification Search
    CPC ............. G06V 10/759; G06Q 30/0241; G06Q 30/0205
    See application file for complete search history.

(56) References Cited

OTHER PUBLICATIONS

Chen et al., "Robust Causal Inference for Incremental Return on Ad Spend With Randomized Geo Experiments", Google LLC, Nov. 26, 2019 (39 pages).
International Search Report and Written Opinion for PCT Appln. Ser. No. PCT/US2020/051823 dated Jan. 18, 2021 (13 pages).
International Preliminary Report on Patentability for Application No. PCT/US2020/051823, dated Oct. 13, 2022, 6 pages.

\* cited by examiner

GEOGRAPHIC DATASET PREPARATION SYSTEM

BACKGROUND

The present disclosure relates generally to the field of geographic experiment models. In a computer networked environment such as the internet, geography-based experiments have been used in an effort to predict the impact of content.

SUMMARY

Some implementations relate to a computer-implemented method of preparing datasets for geo experiments, the method implemented by one or more processing circuits. The method includes receiving, by one or more processing circuits, one or more input parameters associated with a geo experiment for an entity. Further, the method includes receiving, by the one or more processing circuits, data corresponding to a plurality of geographic regions, the data comprising input data, response data, and location identifiers associated with each geographic region, wherein the response data is a result of an action associated with the input data. Further, the method includes extracting, from the data, by the one or more processing circuits, training data associated with a first time interval. Further, the method includes calculating, by the one or more processing circuits, a difference in input data and a difference in response data of the training data for each geographic region of the plurality of geographic regions. Further, the method includes determining, by the one or more processing circuits, a first plurality of geographic pairs based on the difference in response data and the difference in input data of the training data for each geographic region of the plurality of geographic regions. Further, the method includes extracting, from the data, evaluation data associated with a second time interval. Further, the method includes separating the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate. Further, the method includes calculating a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs. Further, the method includes selecting, by the one or more processing circuits, a first subset of geographic pairs of the plurality of different subsets of geographic pairs based on the uncertainty estimates and providing, by the one or more processing circuits, the selected subset of geographic pairs.

In some implementations, generating an outcome estimate is based on calculating a difference in response data and a difference in input data of the evaluation data. In various implementations, calculating the plurality of uncertainty estimates further comprises calculating a root mean square error. In some implementations, the treatment region for the geographic regions of each geographic pair is associated with a first geographic region, and the control region for the geographic regions of each geographic pair is associated with a second geographic region. In various implementations, the first geographic region associated with the treatment region and the second geographic region associated with the control region is randomly selected from the geographic regions of each geographic pair for each of the plurality of simulations. In some implementations, the first geographic region and the second geographic region are associated with a target population. In various implementations, the one or more input parameters comprises at least one of an experiment time interval, one or more geographic locations, a target estimate, and an input amount. In some implementations, the second time interval is smaller than the first time interval and is based at least on the one or more input parameters. In various implementations, the second time interval is in the first time interval, and the evaluation data comprises both a subset of the response data and a subset of input data of the training data.

Some implementations relate to a system with at least one processing circuits. The at least one processing circuit can be configured to receive one or more input parameters associated with a geo experiment for an entity. Further, the at least one processing circuit can be configured to receive data corresponding to a plurality of geographic regions, the data comprising input data, response data, and location identifiers associated with each geographic region, wherein the response data is a result of an action associated with the input data. Further, the at least one processing circuit can be configured to extract, from the data training data associated with a first time interval. Further, the at least one processing circuit can be configured to calculate a difference in input data and a difference in response data of the training data for each geographic region of the plurality of geographic regions. Further, the at least one processing circuit can be configured to determine a first plurality of geographic pairs based on the difference in response data and the difference in input data of the training data for each geographic region of the plurality of geographic regions. Further, the at least one processing circuit can be configured to extract, from the data, evaluation data associated with a second time interval. Further, the at least one processing circuit can be configured to separate the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate. Further, the at least one processing circuit can be configured to calculate a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs. Further, the at least one processing circuit can be configured to select a first subset of geographic pairs of the plurality of different subsets of geographic pairs based on the uncertainty estimates and provide the selected subset of geographic pairs.

In some implementations, generating an outcome estimate is based on calculating a difference in response data and a difference in input data of the evaluation data. In various implementations, calculating the plurality of uncertainty estimates further comprises calculating a root mean square error. In some implementations, the treatment region for the geographic regions of each geographic pair is associated with a first geographic region, and the control region for the geographic regions of each geographic pair is associated with a second geographic region. In various implementations, the first geographic region associated with the treatment region and the second geographic region associated with the control region is randomly selected from the geographic regions of each geographic pair for each of the plurality of simulations. In some implementations, the first geographic region and the second geographic region are associated with a target population. In various implementations, the one or more input parameters comprises at least one of an experiment time interval, one or more geographic locations, a target estimate, and an input amount. In some implementations, the second time interval is smaller than the first time interval and is based at least on the one or more input parameters.

Some implementations relate to one or more computer-readable storage media having instructions stored thereon that, when executed by at least one processing circuit, cause the at least one processing circuit to perform operations. The operations include receiving one or more input parameters associated with a geo experiment for an entity. Further, the operations include receiving data corresponding to a plurality of geographic regions, the data comprising input data, response data, and location identifiers associated with each geographic region, wherein the response data is a result of an action associated with the input data. Further, the operations include extracting, from the data, training data associated with a first time interval. Further, the operations include calculating a difference in input data and a difference in response data of the training data for each geographic region of the plurality of geographic regions. Further, the operations include determining a first plurality of geographic pairs based on the difference in response data and the difference in input data of the training data for each geographic region of the plurality of geographic regions. Further, the operations include extracting, from the data, evaluation data associated with a second time interval. Further, the operations include separating the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate. Further, the operations include calculating a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs. Further, the operations include selecting a first subset of geographic pairs of the plurality of different subsets of geographic pairs based on the uncertainty estimates and providing the selected subset of geographic pairs.

In some implementations, calculating the plurality of uncertainty estimates based on the evaluation data for each of the plurality of different subsets of geographic pairs further comprises calculating a plurality of outcome estimates based on a difference in response data and a difference in input data of the evaluation data for each of the plurality of different subsets of geographic pairs. In various implementations, calculating the plurality of uncertainty estimates further comprises calculating a root mean square error of each of the plurality of outcome estimates.

DETAILED DESCRIPTION

Figure 1:
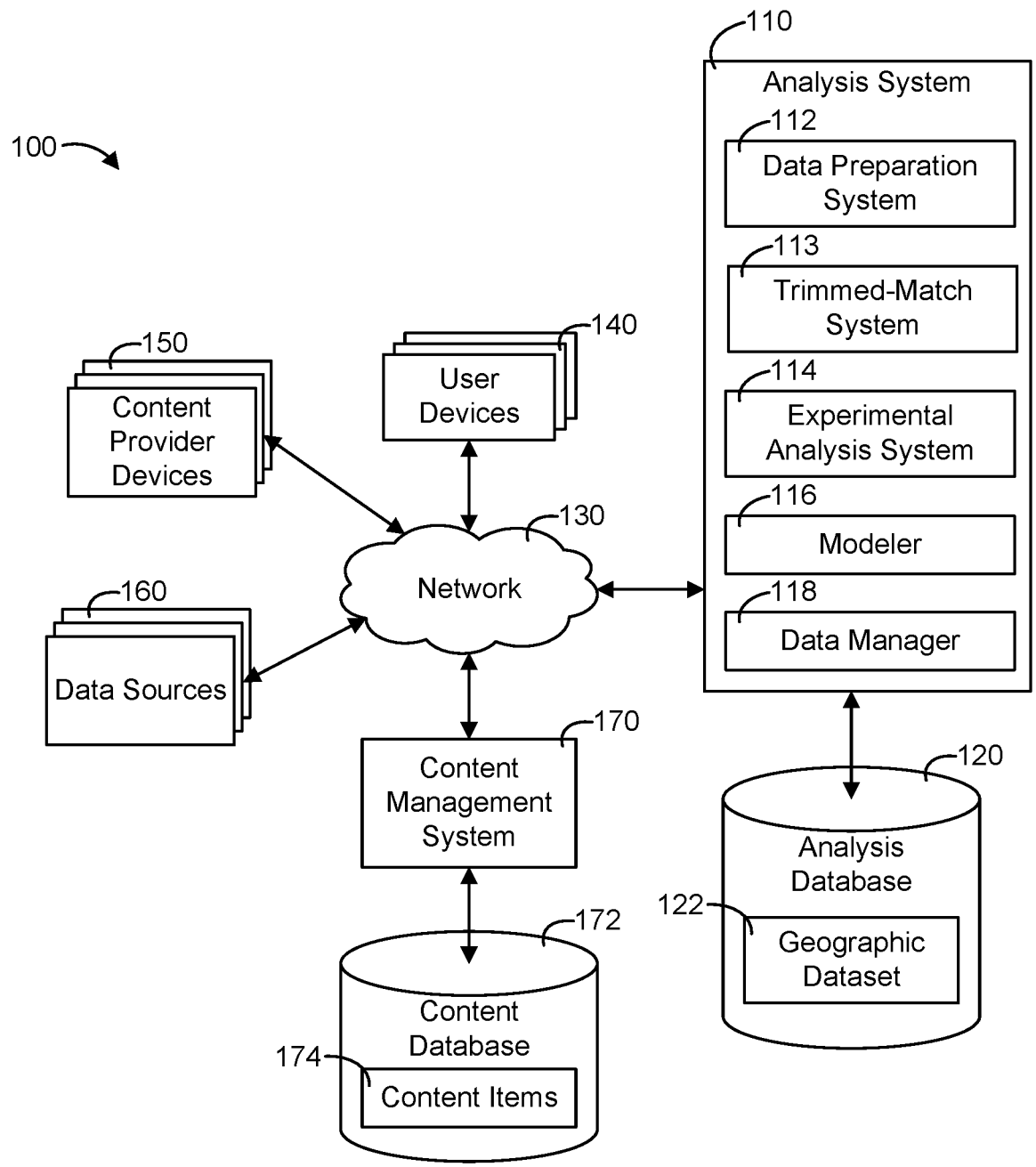
FIG. 1 is a block diagram of an analysis system and associated environment, according to an illustrative implementation.

The present disclosure is directed to systems and method for preparing experimental datasets for geographic experiments. Performing geographic experiment can provide quantitative and qualitative data about the impact of content provider initiatives. In some embodiments, geographic experiments are performed on pairs of matched geos, such that one geo is selected to be the control region and the other geo is selected to be the treatment region. However, accurate impact data can depend on well-matched geos before geographic experiments begin. Thus, the systems and methods described herein describes a method to design geographic experimental datasets (e.g., geographic pairs) based on evaluating pre-experimental data from a plurality of time intervals.

In many systems, to measure the impact of content provider initiatives, content providers employ a geo experiment model which partitions a geographic region of interest into a set of smaller non-overlapping "geos" that are regarded as the units of experimentation rather than the individual users themselves. Indeed, since their introduction, geo experiments have gone on to become a standard tool for the causal measurement of content provider initiatives. However, geo experiments also introduce some additional complexity which makes geo experiment model predictions difficult (e.g., quantitative and qualitative data about the impact of content provider initiatives). Often only a small number of heterogeneous experimental units are available for experimentation, which makes it challenging to obtain reliable geo experiment model predictions with existing methods. Thus, the ability to design geographic experimental datasets for geographic experiments, such that pre-experimental data can be evaluated to select well-matched geographic pairs utilized in a subsequent geographic experiment based on an uncertainty estimate, provides geographic experiment models with accurate data to produce accurate predictions. This causal approach allows geographic experiment models to provide significant improvements to the design of geographic experiments such that the accuracy of predictions and the performance of the geographic experiment models is improved and as a result, enabling content providers to make informed decisions about their initiatives. Therefore, aspects of the present disclosure address problems in preparing geographic data by introducing a causal design approach that evaluates pre-experimental data and provides well-matched geographic pairs to geographic experiment models such that the models can improve performance and produce accurate predictions for content providers.

Accordingly, the present disclosure is directed to systems and methods for geographic dataset preparation. In some implementations, the described systems and methods involve utilizing one or more processing circuits. The one or processing circuits can receive one or more input parameters and data corresponding to a plurality of geographic regions. The data corresponding to the plurality of geographic regions can be utilized to extract various data associated with various time intervals and can be utilized to perform various computer operations. In various implementations, the various computer operations can be utilized to select subsets of geographic pairs associated with the data corresponding to the plurality of geographic regions. That is, preparing geographic data utilizing the geographic experiment model disclosed herein can prepare well-matched geographic pairs such that the geographic experiment models can improve performance and produce accurate experimental results that can be utilized by content providers to make informed decisions about future initiatives based on past and current actions.

In situations in which the systems discussed here collects personal information about users and/or entities, or may make use of personal information, the users and/or entities are provided with an opportunity to control whether programs or features collect user information and/or entity information (e.g., information about a user's social network, social actions or activities, profession, a user's preferences, or a user's current location), or to control whether and/or how to receive content from the content server that may be more relevant to the user and/or entity. In addition, or in the alternative, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user and/or entity have control over how information is collected about the user and/or entity and used by a content server.

Referring now to FIG. 1, a block diagram of an analysis system 110 and associated environment 100 is shown, according to an illustrative implementation. One or more user devices 140 (e.g., smartphones, tablets, computers, etc.) may be used by a user to perform various actions and/or access various types of content, some of which may be provided over a network 130 (e.g., the Internet, LAN, WAN, etc.). A "user" or "entity" used herein may refer to an individual operating user devices 140, interacting with resources or content items via the user devices 140, etc. The user devices 140 may be used to send data to the analysis system 110 or may be used to access websites (e.g., using an internet browser), media files, and/or any other types of content. In some implementations, the user devices 140 have enabled location services which can be tracked over network 130. Locations services may use GPS or other technologies to determine a location of user devices 140.

A content management system 170 may be configured to select content for display to users within resources (e.g., webpages, applications, etc.) and to provide content items to the user devices 140 over the network 130 for display within the resources. The content from which the content management system 170 selects items may be provided by one or more content providers via the network 130 using one or more content provider devices 150. In some implementations, the content management system 170 may select content items from content providers to be displayed on the user devices 140. In such implementations, the content management system 170 may determine content to be published in one or more content interfaces of resources (e.g., webpages, applications, etc.).

The analysis system 110 may be used by content providers in an effort to quantify the impact (e.g., input, response) of content items. The analysis system 110 can include one or more processors (e.g., any general purpose or special purpose processor), and can include and/or be operably coupled to one or more transitory and/or non-transitory storage mediums and/or memory devices (e.g., any computer-readable storage media, such as a magnetic storage, optical storage, flash storage, RAM, etc.). In various implementations, the analysis system 110 and the content management system 170 can be implemented as separate systems or integrated within a single system (e.g., the content management system 170 can be configured to incorporate some or all of the functions/capabilities of the analysis system 110). The analysis system 110 may be configured to communicate over network 130 via a variety of architectures (e.g., client/server, peer-to-peer, etc.). The analysis system 110 can be configured to provide a variety of interfaces for designing geographic experiments, setting up geographic experiments, monitoring progress of geographic experiments, and analyzing results of geographic experiments.

The analysis system 110 can be communicably and operatively coupled to the analysis database 120 which may be configured to store a variety of information relevant to geographic experiments (collectively referred to herein as "geo experiments") performed by a modeler 116. Information may be received from user devices 140, content provider devices 150, data sources 160, and/or content management system 170, for example. The analysis system 110 can be configured to query the analysis database 120 for information and store information in the analysis database 120. In various implementations, the analysis database 120 includes various transitory and/or non-transitory storage mediums. The storage mediums may include but are not limited to magnetic storage, optical storage, flash storage, RAM, etc. The analysis database 120 and/or the analysis system 110 can use various APIs to perform database functions (i.e., managing data stored in the analysis database 120). The APIs can be but are not limited to SQL, NoSQL, NewSQL, ODBC, JDBC, etc.

In some implementations, a content provider submits a request to perform a geo experiment to analysis system 110 and provides one or more input parameters and/or information about the request (e.g., experiment time interval, one or more geographic locations, and an input amount, content items, campaign identification, desired change in input level, geographic areas to target, etc.) which may be stored in analysis database 120 (e.g., geographic dataset 122). In addition, analysis system 110 may be configured to retrieve data via network 130 (e.g., user activity data, content campaign data, etc.) which may be stored in the geographic dataset 122 of analysis database 120.

Analysis system 110 can be configured to communicate with any device or system shown in environment 100 via network 130. The analysis system 110 can be configured to receive information from the network 130. The information may include browsing histories, cookie logs, television content data, printed publication content data, radio content data, and/or online content activity data. The analysis system 110 can be configured to receive and/or collect the interactions that the user devices 140 have on the network 130. This information may be stored as geographic data in a geographic dataset 122.

Data sources 160 may include data collected by the analysis system 110 by receiving interaction data from the content provider devices 150 and/or user devices 140. The data may be content input (e.g., content spend) and response (e.g., content revenue) for particular media channels (e.g., television, Internet content, radio, billboards, printed publications) at one or more points in time. The content input may include spending on television content, billboard content, Internet content (e.g., search content spend, or display content spend), etc. The data may be data input for particular entities or users (e.g., patients, customer purchases, internet content items) at one or more points in time. The content input may include data associated with a plurality of entities, a plurality of users, a specific entity, a specific user, etc. Data sources 160 may be also be various data aggregating systems and/or entities that collect content data. The analysis system 110 can receive geographic sub-region data from the data sources 160 via the network 130. This information may be stored as geographic sub-region data in the geographic dataset 122.

The analysis system 110 can be configured to send information and/or notifications relating to various metrics (e.g., predictions) or models it determines, generates, or fits to the content provider devices 150. This may allow a user of one of the content provider devices 150 to review the various metrics or models which the analysis system 110 determines. Further, the analysis system 110 can use the various metrics to identify opportune times to make contact with a user or appropriate amounts (e.g., an optimal mixed media input) to input on various media channels (e.g., television advertising, Internet advertising, radio advertising, etc.). The analysis system 110 can cause a message to be sent to the content management system 170 and/or the content provider devices 150 indicating that the content management system 170 should make contact with a certain user at a certain time and/or a content campaign operate with certain parameters.

The analysis system 110 may include one or more systems (i.e., computer-readable instructions executable by a processor) and/or circuits (i.e., ASICs, Processor Memory combinations, logic circuits, etc.) configured to perform various functions of the analysis system 110. In some implementations, the systems may be or include a data preparation system 112, a trimmed-match system 113, an experimental analysis system 114, a modeler 116, and a data manager 118. It should be understood that various implementations may include more, fewer, or different systems than illustrated in FIG. 1, and all such modifications are contemplated within the scope of the present disclosure.

The data manager 118 can be configured to generate various data structures stored in the analysis database 120. For example, the data manager 118 can be configured to generate one or more geographic regions (geos). The geos may be a data structure included in the geographic dataset 122 and indicate various geographic areas. For example, the geographic areas could be states, cities, countries, or any other geographic area. The geos can be generated by the data manager 118 by grouping one or more smaller geographic regions together (e.g., sub-regions). For example, the geos could be generated by grouping multiple states into East coast, West coast, and Midwest. Further, multiple cities within a particular state could be grouped together to form a predefined number of the geos.

The data manager 118 can also be configured to receive a plurality of geographic sub-region data for each of the sub-regions that make up the geos. For example, for a particular state, the state may have five geos that are each include five different cities. The data manager 118 can be configured to receive the geographic sub-region data (e.g., stored in geographic dataset 122) for each of the cities of each of the five geos. Based on a correlation between the geographic sub-regions, the geos, and an indication of location in the received data, the geographic sub-region data can be sorted (grouped) into geo-level data by the data manager 118. In some embodiments, the data manager 118 can be configured to receive data for the geos as a whole (e.g., stored in geographic dataset 122) instead of data specific to particular sub-regions that make up the geos. The received data that the data manager 118 receives can be data that analysis system 110 aggregates and/or data that the analysis system 110 receives from the data sources 160.

The data manager 118 can also be configured to communicate with content management system 170 via network 130 in order to determine a set of one or more content items associated with a content provider to be analyzed during a geo experiment. In addition, data manager 118 may be configured to determine one or more characteristics associated with the one or more content items. Characteristics may include associated keywords used in a search query, website views, video views (e.g., via YouTube), content views, content clicks, etc. For example, data manager 118 may be configured to determine (e.g., via a campaign ID or other identifier) content items associated with a content campaign for a new restaurant. In this example, data manager 118 may also determine that the set of content items is presented based on a set of target keywords (e.g., restaurant, new restaurant, restaurant in geographic location, etc.). Data manager 118 may also be configured to initiate a change in input level associated with a set of content items for analysis during a geo experiment.

The data manager 118 can further be configured to retrieve and analyze user activity data including actions performed by user devices 140 over network 130. In some implementations, data manager 118 retrieves user activity data and creates an activity log with one or more log entries. The activity log can span over any specified time period (e.g., past month, past week, etc.) and can be specific to users based on any constraints (e.g., users in France, users in Los Angeles, Android users in Boston, etc.). The data manager 118 may be configured to use a filtered activity log in order to determine a subset of users (i.e., a subset of the users associated with the original activity log). The subset of users may be users that have a likelihood of being exposed to the content items being analyzed. In addition, data manager 118 may be configured to retrieve user activity data related to a response metric being analyzed during a geo experiment.

The geographic dataset 122 may include subsets of data that each include response data, content input data (e.g., input data), a content type, control variables, evaluation data, training data, and/or a location identifier associated with each geo. The data may be for one or more points in time over an interval (e.g., data for each hour out of a day, data for each day out of a year, data for each month out of a decade, etc.). The content type may indicate a particular media channel of the set of data, for example, television, radio, Internet content, newspaper or magazine content, etc. The response data can be a result of an action associated with the input data. That is, the response data may indicate particular amounts of revenue at particular times. In some embodiments, the response is number of conversions, number of sales, number of account registrations, etc. The input data may indicate particular amounts (e.g., fiat currency) of content input for the content type at particular times. The input data may further indicate a number of content runs. The geographic dataset 122 may include time series data structures (also referred to herein as "time intervals") indicating amounts of input data, response data, for various media channels and/or various geographic regions over time.

The data preparation system 112 can be configured to prepare data for geo experiments based on one or more input parameters and pre-geo experiment data. In some implementations, content provider devices 150 may specify one or more input parameters (e.g., experiment budget, experiment time interval, one or more geographic locations, a target incremental response on incremental input (iROCI–θ*), etc.), a set of one or more content items (e.g., some or all items associated with a campaign) to be analyzed, as well as a desired response metric to be recorded during a geo experiment (e.g., randomized geo experiment). In various implementations, the θ* used herein may refer to a value associated with the impact of a content provider initiate. For example, if θ*=2, then for every one unit of content input the content provider receive two units of content response. In another example, if θ*=10, then for every one unit of content input the content provider receive ten units of content response. Accordingly, as iROCI increases, one unit of content input can result in increased units of content response. In another example, a content provider device may specify an experiment budget of $5,000 and an experiment time interval (sometimes referred to as "experiment timeframe") of 1 month. In some implementations, the data preparation system 112 can determine an experimental time interval based on one or more input parameters. For example, the data preparation system 112 could determine an experiment time interval of 1 week based a specified experiment budget. In another example, the data preparation system 112 could determine an experiment time interval of one day based on an event happening in one or more geographic location (e.g., The Super Bowl, Boston Marathon, etc.).

In various implementations, the data preparation system 112 can be configured to extract training data and evaluation data from the geographic dataset 122 for one or more experiments. Both the evaluation data and training data can include response data and input data based on a period of time (e.g., time interval). In some implementations, the training data may include input data and response data based on a first time interval (e.g., 10 years, 2 years, 365 days, 1 month, 1 week, 60 minutes, 60 seconds, etc.). In various arrangements, the first time interval may be based on aggregating historical input data and response data at the geographic level. In some implementations, the first time interval may be based on a factor associated with an experimental time interval. For example, if the experimental time interval is one month, the first time interval may be ten months (i.e., ten factors larger). In various implementations, the first time interval may be based on an input parameter or available data. For example, the content provider may designate a first time interval or the analysis database 120 may store one year of training data.

In various implementations, the evaluation data may include input data and response data based on a second time interval. The second time interval may be less than the first time interval. In one example, the second time interval may be within the first time interval of the training data. That is, the second time interval can be associated with a subset of the training data such that the evaluation data can be response data and input data associated with a smaller time interval compared to the training data. In another example, the second time interval may be outside the first time interval of the training data. That is, the second time interval can be associated with response data and input data that is different than the response data and input data of the training data. In various implementations, the data preparation system 112 can determine that evaluation data of the second time interval may be excluded from the training data of the first time interval. For example, if the first time interval is January 2020, and the second time interval is Jan. 7, 2020-Jan. 14, 2020, the response data and input data associated with the second time interval may be excluded from the training data of the first time interval. In this example, the first time interval may be Jan. 1, 2020-Jan. 6, 2020 and Jan. 15, 2020-Jan. 31, 2020, which excludes the response data and input data associated with the second time interval.

In some implementations, the second time interval may be a similar time interval (or period of time/timeframe) as the experiment time interval. For example, if the experiment time interval is March 2022, the second time interval could be March 2021. In another example, if the experiment time interval is one week, the second time interval may be one week (e.g., or six days, or eight days, etc.). In various implementations, when the first time interval (e.g., one week) is smaller than the experiment time interval (e.g., two weeks), the data preparation system 112 can determine a second time interval based on a factor (e.g., ¼, ½, etc.). The factor may be determined in a variety of ways, including randomization, designation by a content provider, a mathematical formula, or a machine learning algorithm. For example, if the first time interval is ten days, and the experiment time interval is two weeks, the data preparation system 112 may randomly choose a factor of ½ of the first time interval for the second time interval (e.g., five days). In some implementations, when the first time interval is smaller than the experiment time interval, the data preparation system 112 may modify the first time interval. As shown above, the time intervals may be consecutive time (or in sequential order of time), however, the time intervals may be sporadic (i.e., non-consecutive) such that the time intervals can be separated by a period of time. For example, a time interval could each July 4$^{th}$ from the years 2010-2020. In another example, a time interval could be each Saturday and Sunday in a month or a year.

In various arrangements, the data preparation system 112 can store the extracted training data and evaluation data for a specific geo experiment in the geographic dataset 122. That is, each specific geo experiment can include pre-geo experiment data (e.g., training data, evaluation data) and may be located in the analysis database 120. In various implementations, each specific geo experiment may have a unique identifier such that a specific geo experiment can be queried based on the unique identifier.

In one example, the training data may be response data and input data from Jan. 1, 2020 to Jan. 31, 2020 (e.g., 1 month time interval), and the evaluation data may be response data and input data from Sunday, Jan. 19, 2020 to Saturday, Jan. 25, 2020 (e.g., 1 week time interval in January 2020). In this example, the evaluation data can include the same response data and same input data as the training data for the time interval of Jan. 19, 2020 to Jan. 25, 2020. Also as illustrated in this example, the training data may contain greater amounts of data than the training data 124 (e.g., 1 gigabyte vs. 1 megabyte), while also including all of the evaluation data 126. In another example, the training data may be response and input data from Jan. 31, 2019 to Jan. 31, 2020 (e.g., 365-day time interval), and the evaluation data may be response data and input data from March 2019 (e.g., 31-day time interval). In this example, the evaluation data can include 31 days' worth of response data and input data, whereas the training data can include the 31 days' worth of response data and input data of the evaluation data, but also include the other 334 days' worth of response data and input data from January 2019 to January 2020. In yet another example, the training data may be response and input data from Jul. 4, 2025 (e.g., 1-day time interval), and the evaluation data may be response and input data from 5:00 pm-10:00 pm on Jul. 4, 2023 (e.g., 5-hour time interval). In this example, the evaluation data can include 1 days' worth of response data and input data, whereas the training data can include 5 hours' worth of response data and input data from a different year. In another example, the training data may be response and input data for every Saturday in the year 2030 (e.g., 52 Saturday time interval), and the evaluation data may be response data and input data from the Saturdays in March 2030 (e.g., 4 Saturday time interval).

The modeler 116 may be configured to design geographic experiments based on prepared pre-geo experiment data (e.g., evaluation data, training data, and location identifiers stored in analysis database 120) and the one or more input parameters for a specific geo experiment. In various implementations, the activities of multiple systems may be combined as a single system and implemented in a single arrangement (e.g., single processing circuit described in detail with reference to FIG. 5). For example, data preparation system 112 and the modeler 116 can be combined as a single system and implemented in a single arrangement.

In some implementations, the modeler 116 can designate geographic regions as pairs (collectively referred to herein as "geo pairs") based on extracting and/or retrieving the training data of the specific geo experiment. A geographic region of interest (e.g., the United States) can be partitioned into a set of smaller geographic areas, or "geos". These geos can provide comparable sets of users for experimentation during a geo experiment. Details of how geos are chosen are beyond the scope of this disclosure, however geos generally are large enough (e.g., at least larger than a postal code) to ensure content serving accuracy and the ability to monitor the desired response metric at the geo level. In the United States, for example, one possible set of geos is the 210 designated marketing areas (DMAs) as defined by Nielsen Media Research. After a set of two or more geos for the geo experiment are identified, modeler 116 can determine geo pairs. That is, geos are paired up so that two geos in the same pair are more comparable than across pairs based on the training data (e.g., pre-geo experiment response data and pre-geo experiment input data).

For example, the table below describes a plurality of geos associated with a number of interactions included in the training data for a first time interval (sometimes referred to as "timeframe"). In one example, the modeler 116 can pair the geos based on the difference in interactions (e.g., response data) for the first time interval (e.g., one year, one month, one day, every Sunday in a year, etc.).

Before pairing (Table 1):

|   | geo | interactions (million) |
|---|---|---|
| 1 | Los Angeles | 25M |
| 2 | Chicago | 15M |
| 3 | Miami | 11M |
| 4 | Washington | 8M |
| 5 | Milwaukee | 4M |
| 6 | Austin | 2M |
| 7 | Seattle | 7M |
| 8 | Kansas City | 9M |
| 9 | Philadelphia | 14M |
| 10 | Boston | 12M |

After pairing (Table 2):

| pair | geo. 1 | difference (million) | geo. 2 |
|---|---|---|---|
| 1 | Los Angeles | 10M | Chicago |
| 2 | Miami | 3M | Washington |
| 3 | Milwaukee | 2M | Austin |
| 4 | Seattle | 2M | Kansas City |
| 5 | Philadelphia | 2M | Boston |

As shown above, one example of how modeler 116 may determine geo pairs based on a set of geos and each geos training data from the time interval. Further, with n geo pairs, there are 2n possible geo pair assignments. Due to randomization, on average, the geo pairs can have similar overall response data (e.g., interactions), but they may differ somewhat for each particular geo pair assignment. However, if each pair is well-matched (e.g., similar overall response data) or if the number of pairs n is large (e.g., 1,000 geo pairs, 10,000 geo pairs), the difference for a random geo pair assignment is close to zero with high probability.

The modeler 116, can also be configured to extract and/or retrieve evaluation data for a second time interval. The evaluation data may be targeted data compared to the training data. That is, the second time interval may be similar to (i.e., targeted towards) the experimental time interval (e.g., provided by a content provider). For example, the experimental time interval may be July 2027, while the second time interval may be July 2026 such that the modeler 116 can utilize similar data (i.e., targeted data) from similar points in time as the experimental time interval. Accordingly, the training data may be beneficial in determining well-matched geographic pairs from a large period of time (e.g., first time interval), while the evaluation data may be beneficial in determining which well-matched geographic pairs from the large period of time are still well-matched for a smaller period of time (e.g., second time interval and experimental time interval). This geographic experimental design can improve the geographic pairing process by providing well-matched geographic pairs based on two sets of data (i.e., evaluation data and training data) for experimentation such that that the accuracy of predictions and the performance of the geographic experiment models is improved and as a result, enabling content providers to make informed decisions about their initiatives.

In some implementations, the trimmed-match system 113 can perform a plurality of simulations (e.g., geo experiment simulations) to determine a plurality of outcome estimates. The plurality of simulations can be associated with a simulation subset, where each simulation subset can be associated with a particular subset of geographic pairs. That is, each particular subset of geographic pairs may include a simulation subset that includes a plurality of simulations. For example, one particular subset of geographic pairs could include geo pair 1, geo pair 2, and geo pair 3, another particular subset of geographic pairs could include geo pair 1, geo pair 2, geo pair 3, and geo pair 4, and yet another particular subset of geographic pairs could include geo pair 1, geo pair 2, geo pair 3, geo pair 4, and geo pair 5. In this example, the trimmed-match system 113 can perform a plurality of simulation on each particular subset of geographic pairs.

Each simulation can generate a random assignment of treatment geos and control geos with each geo pair. That is, within each pair, the modeler 116 may randomly assign one of the pairs to treatment and the other to control for a particular simulation. During each simulation, a change in input level may only be observed for geos in the treatment group, whereas geos in the control group may remain unchanged. The designation of geos into control or treatment groups can be implemented in a variety of ways, including randomization (as described above) or designation by a content provider.

In some implementations, once the geos are paired based on the training data, the modeler 116 can be configured to analyze the treatment group of the evaluation data and the one or more input parameters to determine an incremental input and incremental response for the second time interval. The incremental input used herein may refer to the additional input of a content provider to receive one additional response. The incremental response used herein may refer to the additional response to the content provider as result of action associated with incremental input. That is, the evaluation data can include previous geo-experiment data associated with input data and response data for each geo g, such that the modeler 116 can calculate the incremental input and incremental response of the treatment group of the evaluation data. In various implementations, the content provider can provide a target incremental response on content input (iROCI). The target iROCI may be also be determined by the one or more processing circuits could be based on historical experimental data (e.g., response data, input data, geo experiments), data from other sources (e.g., data sources 160 in FIG. 1, content database 172 in FIG. 1), randomization, designation by the content provider (i.e., input parameters), a mathematical formula, and/or a machine learning algorithm.

Prior to a geo experiment and for each simulation, modeler 116 can designate G to be the set of geos for a target population. Given a geo $g \in G$, let $(S_g, R_g) \in R^2$ denote its observed bivariate outcome, where $S_g$ is content input and $R_g$ is the response variable. Geo g's can denote potential outcome under the control and treatment content serving conditions as $(S_g^{(C)}, R_g^{(C)})$ and $(S_g^{(T)}, R_g^{(T)})$ respectively, where the modeler 116 can observe one of these two bivariate potential outcomes for each geo g. For each geo g, there can be two unit-level causal effects caused by the new content strategy: incremental content input and incremental response of the evaluation data, which can be defined by $S_h^{(T)} - S_g^{(C)}$ and $R_g^{(T)} - R_g^{(C)}$ respectively. The incremental response on content input (iROCI) with respect to geo g, denoted as $\theta_g$, can be the ratio of incremental response to incremental content input (Equation 1):

$$\theta_g = \frac{R_g^{(T)} - R_g^{(C)}}{S_g^{(T)} - S_g^{(C)}}$$

and the iROCI with respect to the population G can be defined similarly (Equation 2):

$$\theta^* = \frac{\frac{1}{|G|} \Sigma_{g \in G} R_g^{(T)} - R_g^{(C)}}{\frac{1}{|G|} \Sigma_{g \in G} S_g^{(T)} - S_g^{(C)}}$$

Content providers may find $\theta^*$ to be a more informative pre-experiment prediction that can provide a target content performance, which is the parameter used hereafter.

In general, geo experiments often introduce some additional complexity which makes the pre-experiment prediction of the iROCI (i.e., estimated content performance) more difficult. In particular, the no interference component of the stable unit treatment value assumption. That is, the presumption that the treatment applied to one experimental unit does not affect the outcome of another experimental unit can be particularly challenging to satisfy since it may require the geos to be defined such that spillover effects (e.g. from consumers traveling across geo boundaries) can be negligible. Thus, minimizing spillover effects can often result in only a small number of highly heterogeneous geos being available for experimentation, and therefore the distributions of $\{Sg: g \in G\}$ and $\{Rg: g \in G\}$ can be very heavy-tailed. For example, a heavy-tailed distribution may include a distribution that analyzes how many cups of coffee does each person drink per week. In this example, 80% of the distribution may be people that drink three cups of coffee per week, whereas 1% of the distribution may be people that drink twenty cups of coffee per week. As shown in this example, the distribution may be heavy-tailed towards the 1% of coffee drinkers than drink twenty cups of coffee per week.

Rearranging Equation 1:

$$R_g^{(C)} - \theta_g S_g^{(C)} = R_g^{(T)} - \theta_g S_g^{(T)}$$

Based on this analysis, modeler 116 can generate predictions (sometimes referred to as estimated iROCI's) to solve for the value of $\theta^*$, which can provide a pre-experiment estimated content performance.

The following table describes the notation as it shall be used hereafter. The notation is denoted as follows:

$R_{ic}$, $S_{ic}$: Response and content input for control geo $R_{it}$, $S_{it}$: Response and content input for treatment geo $Y_i = R_{it} - R_{ic}$: Difference in the responses $X_i = S_{it} - S_{ic}$: Difference in content input $\epsilon_i(\theta) = Y_i - X_i \theta$: Difference in response background noise with respect to $\theta$ Utilizing prepared pre-geo experiment data, the distribution of $\epsilon_i(\theta^*)$ can be symmetric about an outcome estimate prespecified value (e.g., zero) for i=1, ..., n. Therefore, the expected value of $\epsilon_i(\theta^*)$ can be zero. To calculate the estimated iROCI, it is the goal of the modeler 116 to accurately predict the value of $\theta^*$ (i.e., target iROCI) based on $\epsilon_i(\theta^*)$. However, an accurate prediction may be flawed when geo pairs are poorly matched. That is, it can be difficult to know whether or how much the two geo pairs are comparable during the geographic pairing process, because for example, geos are all different from each other, and some can be much larger than others (i.e., geo heterogeneity), and/or the responses between two geos (or two groups) may be quite comparable utilizing the training data for geo pairing, but may become quite different during a geo experiment even if there is no experiment intervention (i.e., temporal dynamics). For examples, these can be caused by factors such as the time interval difference between the training data (e.g., one year) and the experimental time interval (e.g., one month) or other marketing factors which cannot be controlled.

Accordingly, the trimmed-match system 113 can be configured to trim poorly-matched geo pairs (e.g., heterogeneous pairs) based on a trimming model before a geo experiment has been run for a plurality of simulations. In other words, the trimmed-match system 113 can be configured to select a subset of geographic pairs of a plurality of different subsets of geographic by calculating a plurality of uncertainty estimates based each simulation subset that includes a plurality of simulated outcome estimates and the target iROCI. In some implementations, the trimmed-match system 113 retrieves geo pair data (e.g., treatment group of the evaluation data) from the geographic dataset 122 related to the geo pairs analyzed during a previous geo experiment for a specific time interval (e.g., second time interval of the evaluation data). In general, even with a careful randomized matched-pairs design (e.g., how the geo pairs are matched), where the two geos within each pair are well-matched based on pre-geo experiment data based on two sets of data (i.e., evaluation data and training data). The trimmed-match system 113 can utilize a trimming model to remove (or trim) poorly-match geo pairs based on an outcome estimate (e.g., difference in input and difference in response data between the treatment geo and control geo of each geographic pair) to provide a trimmed dataset (e.g., selected subset of geographic pairs) to the modeler 116. That is, by removing certain geos that may disproportionally affect the results of a causal geo experiment, a trimming model can be utilized to provide improved geo pair matches (e.g., trimmed dataset) for experimentation.

The trimmed-match system 113 can utilize a trimming model to utilize the following derivation of the trimming model assuming that $\epsilon_1(\theta) \leq \epsilon_2(\theta) \leq \epsilon_3(\theta) \leq \ldots \leq \epsilon_n(\theta)$ to be the corresponding order statistics. This trimming model can utilize a fixed value, $\lambda$, to be a fixed trim rate, where $0 \leq \lambda < \frac{1}{2}$. A trimmed mean statistic can be defined as the following equation (Equation 4):

$$\bar{\epsilon}_{n\lambda}(\theta) \equiv \frac{1}{n-2m} \sum_{i=m+1}^{n-m} \epsilon_i(\theta)$$

where m is the minimal integer greater or equal to $\lceil n\lambda \rceil$. It should be noted that $\lambda$ must satisfy $n-2m \geq 1$, otherwise all members of the set of geos would be trimmed away. Following the derivations above, the trimmed mean statistic can have an expected value of zero. Therefore, the trimmed-match system 113 can determine one or more roots (e.g., outcome estimates), given a fixed value $\lambda$ that can satisfy the trimmed match equation below (Equation 5):

$$\bar{\epsilon}_{n\lambda}(\theta^*)=0$$

When multiple roots exist, the trimmed-match system 113 can utilize a trimming model to choose the root which minimizes a statistic (e.g., symmetric deviation), in part using the equation below (Equation 6):

$$D_{n\lambda}(\theta) \equiv \frac{1}{n-2m} \sum_{i=m+1}^{n-m} |\epsilon_i(\theta) + \epsilon_{n-i+1}(\theta)|$$

which can measure the symmetric deviation from zero. A trimmed match estimator (i.e., estimated iROCI) can be formally defined as (Equation 7):

$$\hat{\theta}_\lambda^{(trim)} = \arg\min\{D_{n\lambda}(\theta): \bar{\epsilon}_{n\lambda}(\theta)=0\}$$

Thus, when two geos in the ith pair are "perfectly" matched, trimmed-match system 113 can expect $\epsilon_i(\theta^*)=0$. That is, if $\lambda=0$, then no trimming takes place and $\hat{\theta}_\lambda^{(trim)}$. It can also be understood that the trimmed match estimator can directly estimate $\theta^*$ (estimated iROCI) without determining either the incremental response or the incremental input.

Further, the trimmed match estimator can be utilized after trimming the geo pairs that are poorly matched in terms of the $\epsilon_i(\theta_\lambda^{(trim)})$ values.

Therefore, $\hat{\theta}_\lambda^{(trim)}$ trims the poorly matched pairs in the sense of $\epsilon_i(\theta^*)$ and estimates iROCI based on the untrimmed pairs for each simulation. That is, for each simulation k an estimated iROCI ($\hat{\theta}^{(k)}$) can be found. The statistical framework to solve for the trimmed match prediction is formally defined as (Algorithm 1):

Input $\{(x_i, y_i): 1 \leq i \leq n\}$ and trim rate $\lambda > 0$; Output: roots of Equation 5.

(i) Reorder the pairs $\{(x_i, y_i): 1 \leq i \leq n\}$ such that $x_i < \ldots < x_n$; Calculate $\{\theta_{ij}: 1 \leq i < j \leq n\}$ and order them such that $\theta_{i_1 j_1} < \theta_{i_2 j_2} < \ldots \theta_{i_N j_N}$.

(ii) Start with $\theta=-\infty$ and initialize the set of untrimmed indices with:

$$I \leftarrow \{i: \lceil n\lambda \rceil < i \leq n - \lceil n\lambda \rceil\}$$

Calculate:

$$a \leftarrow \sum_{i \in I} y_i \text{ and } b \leftarrow \sum_{i \in I} x_i$$

Initialize two ordered sets $\theta_1 = \{\}$ and $\theta_2 = \{\}$
(iii) For $k=1, \ldots, N$:
  (a) If $i_k \in I$ and $j_k \notin I$, then update,
    $I \leftarrow I + \{j_k\} - \{i_k\}$,
    $a \leftarrow a + y_{j_k} - y_{i_k}$
    $b \leftarrow b + x_{j_k} - x_{i_k}$
  and append $a/b$ to $\theta_1$ and $\theta_{i_k j_k}$ to $\theta_2$, i.e., $$\theta_1 \leftarrow \theta_1 + \left\{\frac{a}{b}\right\}$$

$$\theta_2 \leftarrow \theta_2 + \{\theta_{i_k j_k}\}$$

(b) If $i_k \notin I$ and $j_k \in I$, then update,
    $I \leftarrow I + \{i_k\} - \{j_k\}$
  and repeat the similar procedure as in (a).
  (c) Otherwise, continue.
(iv) Output a subset of $\theta_1$:
  (a) Append $\infty$ to $\theta_2$;
  (b) For $k=1, \ldots, |\theta_1|$,
    (i) Output $\theta_1[k]$ if $\theta_2[k] \leq \theta_1[k] \leq \theta_2[k+1]$ For ease of technical derivation, it can be considered the situation where the n pairs of geos are an independent and identically distributed random sample drawn from an infinite population consisting of highly heterogeneous pairs of geos.

Under Section I of the statistical framework, let $\{(x_i, y_i): 1 \leq i \leq n\}$ be a set of independent and identically distributed random variables based on some population distribution P. Under Section III of the statistical framework the distribution of $\epsilon_i(\theta^*)(1 \leq i \leq n)$ can be symmetric about zero.

The trimmed-match system 113 utilizing the trimming model can correctly solve the trimmed match equation (i.e., Equation 5) above based on Algorithm 1, utilizing a fixed trim rate to determine which pairs of geos in the randomized geo experiment to exclude based on how well they match. The geo pairs that are matched the most poorly are trimmed from the set, while maintaining the pairs that are matched very well (e.g., trimmed dataset) for experimentation. Algorithm 1 looks at all candidate values of $\theta$ as it grows from $-\infty$ to $\infty$, and identifies the set of thresholds where the ordering of $\epsilon_i(\theta)$ changes whenever $\theta$ passes those thresholds.

In order for the Algorithm 1 to work properly, a proper trim rate must be chosen. The trimmed-match system 113 can utilize a trimming model to determine a trim rate for trimmed match equation as follows (Equation 8):

$$\hat{\lambda} = \arg\min(\widehat{\sigma_\lambda^2})$$

And by minimizing the asymptotic variance (e.g., a type of standard error) of $\hat{\theta}_\lambda^{(trim)}$. The equation for an estimate of asymptotic variance can be found in the equation below (Equation 9):

$$\widehat{\sigma_\lambda^2} = \frac{\hat{E}(\epsilon^2 \wedge q^2)}{\left[\hat{E}(X \cdot I(|\epsilon| \le q))\right]^2}$$

In Equation 9, the value of $\hat{E}(\epsilon^{2\wedge}q^2)$ is defined as (Equation 10):

$$\hat{E}(\epsilon^2 \wedge q^2) \equiv \frac{1}{n}\left(m(\hat{\epsilon}_{m+1}^2 + \hat{\epsilon}_{m+1}^2) + \sum_{i=m+1}^{n-m} \hat{\epsilon}_i^2\right)$$

and $\hat{E}(X \cdot I(|\epsilon| \le q))$ is defined as (Equation 11):

$$\hat{E}(X \cdot I(|\epsilon| \le q)) = \frac{1}{n}\sum_{i=1}^{n} X \cdot 1(\hat{\epsilon}_{m+1} \le \hat{\epsilon}_i \le \hat{\epsilon}_{n-m})$$

where $\hat{\epsilon} = Y_i - \hat{\theta}_\lambda^{(trim)} X_i$. The value for the trim rate can be determined by minimizing Equation 9 with respect to $\lambda$. Alternatively, a proper trim rate may be choose based on various alternatives (e.g., different types of standard errors) to asymptotic variance. In some implementations, various alternatives include heuristic choice (e.g., availability, rule of thumb, absurdity, common, consistency, contagion, working backward, scarcity, familiarity) based on a default selection and/or historical data (e.g., stored in geographic dataset 122, and/or data sources 160), various approximation by sampling (e.g., bootstrap techniques, cross-validation techniques, statistical test, combined F-test), width of confidence interval (with reference to equation 12 below), and any other any alternatives known to a person of ordinary skill in the art.

That is, the performance of a confidence interval can be measured by its power and empirical coverage, where the power can be defined to be the percent of replicates with lower confidence interval bounds greater than 0, and the empirical coverage is the percent of replicates with confidence intervals containing $\theta^*$.

The confidence interval (e.g., trimmed match confidence interval) can be constructed based on the minimal interval that contains all $\theta$ satisfying $|T_{n\lambda}(\theta)| \le c$, where the threshold c can be determined based on $P(|T_{n\lambda}(\theta)| \le c) = 1-\alpha$. That is, to determine the confidence interval the trimmed-match system 113 can let $T_{n\lambda}(\theta)$ be the studentized trimmed mean statistic with respect to $\{\epsilon_{n\lambda}(\theta) \ 1 \le i \le n\}$, defined as follows (Equation 12):

$$T_{n\lambda}(\theta) = \frac{\bar{\epsilon}_{n\lambda}(\theta)}{\left(\frac{\hat{\sigma}_{n\lambda}(\theta)}{\sqrt{n-2m-1}}\right)}$$

where (Equation 13)

$$\hat{\sigma}_{n\lambda}^2(\theta) = \frac{m[\epsilon_{(m+1)}(\theta)]^2 + \sum_{i=m+1}^{n-m}[\epsilon_{(i)}(\theta)]^2 + m[\epsilon_{(n-m)}(\theta)]^2 - n[\bar{\omega}_{n\lambda}(\theta)]^2}{}$$

is the winsorized variance estimate for $\bar{\epsilon}_{n\lambda}(\theta)$, and (Equation 14)

$$\bar{\omega}_{n\lambda} = \frac{m \cdot \epsilon_{(m+1)}(\theta) + \sum_{i=m+1}^{n-m} \epsilon_{(i)}(\theta) + m \cdot \epsilon_{(n-m)}(\theta)}{n}$$

is the winsorized mean of $\epsilon_{(i)}(\theta)$s.

When the distribution of $\{\epsilon_{(i)}(\theta^*) \ i=1, 2, \ldots, n\}$ is not too heavy tailed, the studentized trimmed mean statistic $T_{n\lambda}(\theta)$ is approximately t-distributed with n−2m−1 degrees of freedom. Therefore, in this case, a confidence interval for $\theta^*$ can be constructed by choosing the critical value $$c = t_{1-\frac{\alpha}{2}, n-2m-1},$$

where $t_{1-\frac{\alpha}{2}, n-2m-1}$ is the $1-\frac{\alpha}{2}$ quantile of t-distribution with (n−2m−1) degrees of freedom. Thus, it is adopted herein that the distribution of $\epsilon_{(i)}(\theta^*)$ is symmetric about zero for i=1, . . . , n.

Accordingly, the trimmed-match system 113 can utilize the trimming model to remove geo pairs from the dataset of geo pairs based on the trim rate, for a particular simulation subset associated with a plurality of simulation associated with a particular treatment group and a particular control group. For example, when the trim rate is equal to zero, no geo pairs are removed. In another example, if the trim rate is equal to 1, two sets of geo pairs are removed based on the symmetric deviation from zero. That is, the largest symmetric deviation geo pair and smallest symmetric deviation geo pair are removed from the dataset of geo pairs. In yet another example, if the trim rate is equal to 2, four sets of geo pairs are removed based on the symmetric deviation from zero. That is, the two largest symmetric deviation geo pair and two smallest symmetric deviation geo pair are removed from the dataset of geo pairs. In some implementation, the dataset of geo pairs that have been trimmed can be referred to as a trimmed dataset of geo pairs and/or selected subset of geographic pairs. In some implementations, the trimmed-match system 113 can be configured to provide the plurality of outcome estimates (i.e., estimated iROCI's) for a plurality of simulations for a plurality of different subsets of geographic pairs to the modeler 116. In various implementations, the trimmed-match system 113 can store the outcome estimates in the geographic dataset 122 (e.g., ordered by content provider, grouped by characteristics, etc.).

In some implementations, once plurality of simulations for a plurality of different simulation subsets are performed that generate outcome estimates (estimated iROCI) and given a target iROCI, the modeler 116 can be configured to determine a plurality of uncertainty estimates for each of a plurality of different subsets of geographic pairs. An uncertainty estimate can be measured by the root mean square errors equation, as follows (Equation 15):

$$RMSE(\hat{\theta}) = \sqrt{\frac{1}{K}\sum_{k=1}^{K}\left(\hat{\theta}^{(k)} - \theta^*\right)^2}$$

where $\hat{\theta}^{(k)}$ is the estimated value (sometimes referred to as the "simulated value") of $\theta^*$ from the kth simulation (i.e., simulated value based on the prepared pre-geo experiment data, in particular, the treatment group of the evaluation data). With reference to Table 2, an uncertainty estimate could be calculated when with a subset of geographic pairs that includes all the geo pairs, is shown below (i.e., trim rate=0/5=0) (Table 3):

| SIM | Treatment group | Control group | $\hat{\theta}^{(k)}$ | $\theta^*$ | $(\hat{\theta}^{(k)} - \theta^*)^2$ |
|---|---|---|---|---|---|
| 1 | Miami, Chicago, Austin, Seattle, Boston | Washington, Philadelphia, Milwaukee, Kansas City, Los Angeles | 4.59 | 5 | 0.1681 |
| 2 | Washington, Chicago, Austin, Seattle, Boston | Milwaukee, Philadelphia, Miami, Kansas City, Los Angeles | 7.83 | 5 | 8.0089 |
| 3 | Washington, Philadelphia, Milwaukee, Kansas City, Los Angeles | Miami, Chicago, Austin, Seattle, Boston | 5.46 | 5 | 0.2916 |
| 4 | Miami, Philadelphia, Milwaukee, Kansas City, Los Angeles | Washington, Chicago, Austin, Seattle, Boston | 2.13 | 5 | 8.2369 |

Furthermore, the RMSE($\hat{\theta}$) could be calculated by:

Uncertainty Estimate =

$$RMSE(\hat{\theta}) = \sqrt{\frac{1}{4}\sum_{k=1}^{4}\left(\hat{\theta}^{(k)} - \theta^*\right)^2} = \sqrt{\frac{1}{4}*16.7055} = 2.0436$$

With reference to Table 2, an uncertainty estimate with a subset of geographic pairs that includes geo pairs 1, 3, and 5 is shown below (i.e., trim rate=⅕=0.2)(Table 4):

| SIM | Treatment group | Control group | $\hat{\theta}^{(k)}$ | $\theta^*$ | $(\hat{\theta}^{(k)} - \theta^*)^2$ |
|---|---|---|---|---|---|
| 1 | Chicago, Austin, Boston | Philadelphia, Milwaukee, Los Angeles | 4.59 | 5 | 0.1681 |
| 2 | Los Angeles, Austin, Boston | Milwaukee, Philadelphia, Chicago | 4.41 | 5 | 0.3481 |
| 3 | Boston, Milwaukee, Los Angeles | Chicago, Austin, Philadelphia | 5.20 | 5 | 0.0400 |
| 4 | Philadelphia, Milwaukee, Los Angeles | Chicago, Austin, Boston | 5.62 | 5 | 0.3844 |

Furthermore, the RMSE($\hat{\theta}$) could be calculated by:

Uncertainty Estimate =

$$RMSE(\hat{\theta}) = \sqrt{\frac{1}{4}\sum_{k=1}^{4}\left(\hat{\theta}^{(k)} - \theta^*\right)^2} = \sqrt{\frac{1}{4}*0.9406} = 0.4849$$

Accordingly, the modeler 116 can be configured to select a subset of geographic pairs of a plurality of different subsets of geographic pairs based on an uncertainty estimate of a plurality of uncertainty estimates. In some implementations, the modeler 116 can retrieve prepared pre-geo experiment data from the geographic dataset 122 related to the well-matched geographic pairs based on two sets of data (i.e., evaluation data and training data) prepared by the data preparation system 112. The modeler 116 can utilize the RMSE equation (Equation 15) to remove (or trim) poorly-match geo pairs based on a plurality of simulation subsets to provide a trimmed dataset (e.g., selected subset of geographic pairs) to the experimental analysis system 114 for experimentation and analysis. That is, by removing certain geos that may disproportionally affect the results of a causal geo experiment, a geo experiment design can be utilized to provide improved geo pair matches for experimentation to the experimental analysis system 114. Thus, after evaluating the uncertainty estimates, the modeler 116 may select the subset of geographic pairs that includes geo pairs 1, 3, and 5 for experimentation (Table 5):

| pair | geo. 1 | geo. 2 |
|---|---|---|
| 1 | Los Angeles | Chicago |
| 3 | Milwaukee | Austin |
| 5 | Philadelphia | Boston |

As shown above, one example of how modeler 116 may select a subset of geographic pairs based on selecting the minimized (or smallest/closest to zero) uncertainty estimate of Equation 15. That is, additional details associated with the uncertainty estimates of modeler 116 are described in detail with reference to FIG. 3.

The experimental analysis system 114 can be configured to perform geo experiments and analyze results (e.g., response metrics of geo pairs) of geo experiments to calculate predictions (e.g., post-experiment outcome estimates). In some implementations, experimental analysis system 114 can retrieve data via network 130 related to one or more response metrics being analyzed during the experiment. For example, if the response metric being measured is physical entity response, experimental analysis system 114 can be configured to retrieve entity response data over network 130. A variety of response metrics can be tracked during a geo experiment. In some implementations, the response metric is an offline response metrics such as physical entity responses. Entity responses may be determined using location information (e.g., location identifier) from one or more user devices 140. In some implementations, the response metric may include user interactions in a mapping interface, which may be indicative of an intention to visit a physical location or entity. User interactions with the mapping interface may include, for example, searching for entity locations within the control group or treatment group, requesting directions to a location of an entity within the control group or the treatment group, and/or navigating to a location of an entity within the control group or the treatment group. Online response metrics such as response data (e.g., conversion data) or any other user-specific action that can be measured and defined as a response event (e.g., online response, provision of requested data via an online form, etc.) can also be used. The experimental analysis system 114 can retrieve data from content management system 170, user devices 140 (e.g., through the use of cookies or other identifiers), content provider devices 150, and/or data sources 160, for example. In some implementations, experimental analysis system 114 can store geo experiments results in the geographic dataset 122.

The experimental analysis system 114 can be configured to analyze the geo experimental data to determine content effectiveness. In one example, the experimental analysis system 114 can provide a prediction, post geo-experiment, for the value of $\theta^*$ as discussed above. That is, the experimental analysis system 114 can be configured to analyze experimental datasets (e.g., post-geo experiment data) and provide predictions to content providers associated with content effectiveness (e.g., content input and response, iROCI). In some implementations, the iROCI predictions can be content provider specific such that content provider can utilize the information to determine future content input for particular geographic areas and potential response from the content input. In various implementations, the iROCI predictions may be associated with a plurality of content providers. In some implementations, analyzing may include using a machine learning algorithm (e.g., a neural network, convolutional neural network, recurrent neural network, linear regression model, and sparse vector machine). The experimental analysis system 114 can input one or more datasets into a machine learning model and receive an output from the model providing predictions to content providers associated with content effectiveness (e.g., content input and response, iROCI).

The experimental analysis system 114 can also be configured to determine one or more characteristics (e.g., search queries, industry, vertical, subject matter) associated with a set of content items. The characteristic may be used to filter an activity log including a list of each user computing device (e.g., user computing devices 140) actions in order to determine a subset of users that have a likelihood of being exposed to the content items. Each user of the subset of users may belong to one of the geos being analyzed during the geo experiment (e.g., may be physically present within the geo, may have a place of residence or work inside the geo, etc.).

Figure 2:
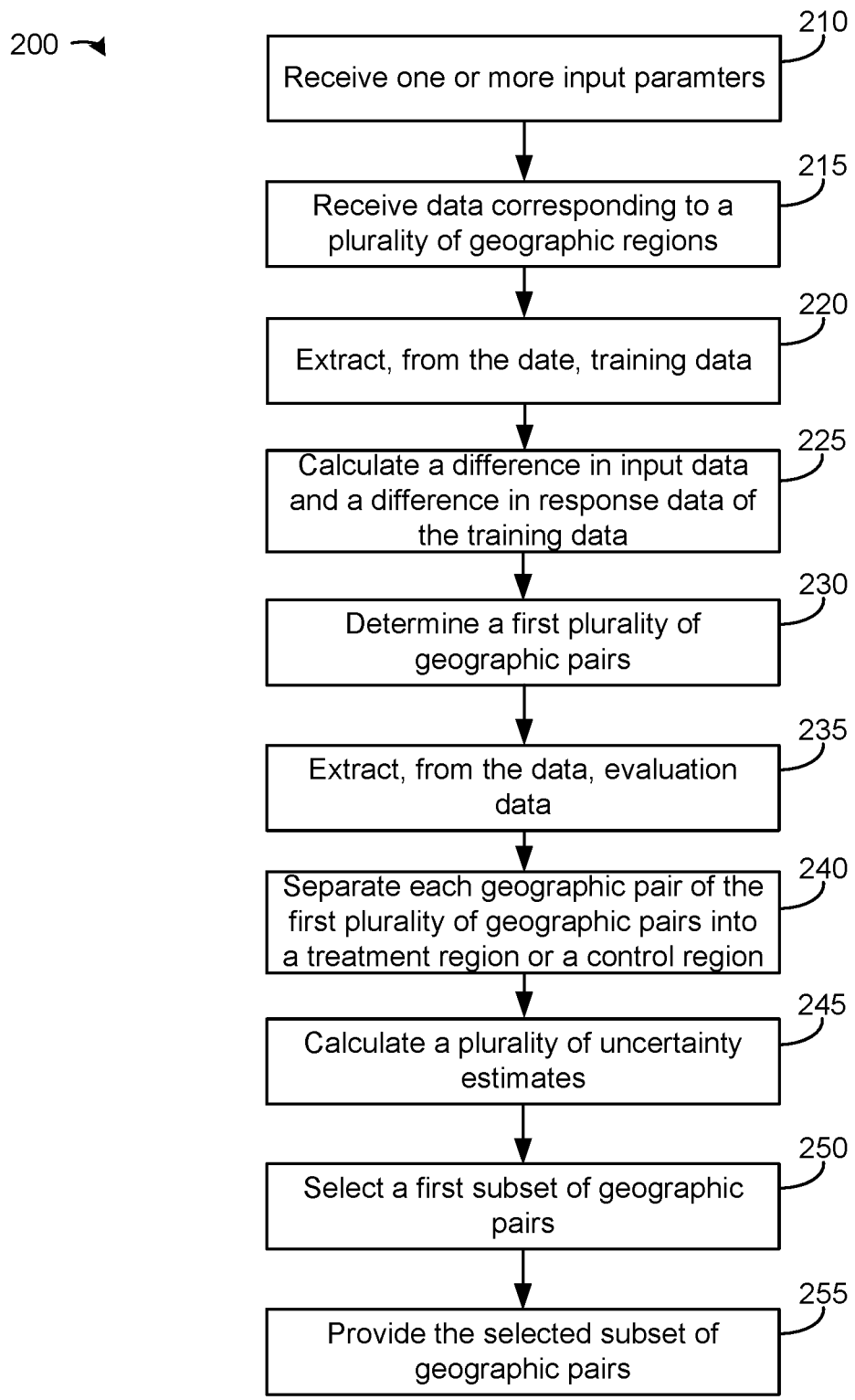
FIG. 2 is a flow chart for a method of preparing datasets for geographic experiments, according to an illustrative implementation.

Referring now to FIG. 2, a flow chart for a method 200 of preparing datasets for geographic experiments, according to an illustrative implementation. The analysis system 110 and associated environment 100 can be configured to perform the method 200. Furthermore, any computing device described herein can be configured to perform the method 200.

In broad overview of the method 200, at block 210, the one or more processing circuits can receive one or more input parameters. At block 215, the one or more processing circuits can receive data corresponding to a plurality of geographic regions. At block 220, the one or more processing circuits can extract, from the data, training data. At block 225, the one or more processing circuits can calculate a difference in input data and a difference in response data of the training data. At block 230, the one or more processing circuits can determine a first plurality of geographic pairs. At block 235, the one or more processing circuits can extract, from the data, evaluation data. At block 240, the one or more processing circuits can separate each geographic pair of the first plurality of geographic pairs into a treatment region or a control region. At block 245, the one or more processing circuits can calculate a plurality of uncertainty estimates. At block 250, the one or more processing circuits can select a first subset of geographic pairs. At block 255, the one or more processing circuits can provide the selected subset of geographic pairs.

Referring to method 200 in more detail, at block 210, the one or more processing circuits can receive one or more input parameters associated with a geo experiment for an entity (e.g., content provider). The one or more input parameters can be received by a content provider via content provider devices 150, for example. A variety of information to be analyzed may be included in the one or more input parameters, such as which content item(s) or campaign(s) is to be analyzed, an amount of spend change, a prespecified value that can dictate a limit associated with a inequality (e.g., greater than, less than, equal to, or combination of the three) for an uncertainty estimate, a number of geographic pairs can dictate a limit associated with a inequality (e.g., greater than, less than, equal to, or combination of the three) for the number of geographic pairs utilized in a geo experiment, an experimental time interval, and a desired response. As described above, response data may include many different types of data, such as offline (e.g., store visit) data or online conversion events (e.g., clicks, views, online sales, searches, cross channel (e.g., from a television content item, and/or any other content item on a media channel), etc.). In some implementations, content providers may wish to analyze the effect of content provided over network 130 on offline response. In such implementations, analysis system 110 can be configured to analyze the effects of a change in input level on physical store visits or expressed interest in visiting a physical store (e.g., searching for store location and/or requesting directions to a store). Physical store visits can be determined by retrieving data from location-enabled user devices 140 and/or retrieving data from data sources 160. Information included with the one or more parameters to design and perform a geo experiment may be stored in analysis database 120.

At block 215, the one or more processing circuits can receive data corresponding to a plurality of geographic regions, the data including input data, response data, and location identifiers associated with each geographic region, wherein the response data is a result of an action associated with the input data. The input data, response data, and location identifiers associated with each geographic region may be collected from a variety of sources and stored together. In some implementations, the input data, response data may be inferred utilizing one or more machine learning algorithms (e.g., a neural network, convolutional neural network, recurrent neural network, linear regression model, sparse vector machine, or any other algorithm known to a person of ordinary skill in the art). The data corresponding to the plurality of geographic regions can be received via an analysis database 120 (in particular, the geographic dataset 122), user devices 140, content provider devices 150, data sources 160, and/or content management system 170, for example. The response data and input data may be categorized/grouped by a particular period of time (e.g., time interval).

At block 220, the one or more processing circuits can extract, from the data, training data associated with a first time interval. In some implementations, the training data may be extracted from the received data corresponding to the plurality of geographic regions. In some implementations, extracting the training data may be performed by the data preparation system 112. Extracting may include analyze and crawling through (i.e., data crawling) the data corresponding to the plurality of geographic regions to determine what response data and input data corresponds to the first time interval.

At blocks 225 and 230, the one or more processing circuits can calculate a difference in input data and a difference in response data of the training data for each geographic region of the plurality of geographic regions and the one or more processing circuits can determine a first plurality of geographic pairs based on the difference in response data and the difference in input data of the training data for each geographic region of the plurality of geographic regions. Each geographic pair of the dataset of the plurality of geographic pairs can include a first geographic region and a second geographic region. In some implementations, the dataset of the plurality of geographic pairs can be stored in one or more databases (e.g., analysis database 120). In various implementations, the one or more processing circuits can identify a dataset of a plurality of geographic triplets (e.g., three geos per triplet). In one example, the tables below, illustrate each geo may be associated with a total number of interactions and the difference between each interaction can be calculated and paired.

Before pairing (Table 6):

| | geo | interactions (million) |
|---|---|---|
| 1 | New York City | 19M |
| 2 | Los Angeles | 13M |
| 3 | Chicago | 9.5M |
| 4 | Dallas | 8M |
| 5 | Houston | 7M |
| 6 | Washington | 6M |
| 7 | Miami | 5M |
| 8 | Philadelphia | 4.6M |
| 9 | Atlanta | 3M |
| 10 | Boston | 1M |
| ... | ... | ... |
| 79 | Madison | 0.3M |
| 80 | Honolulu | 0.2M |

After pairing (Table 7):

| pair | geo. 1 | difference (million) | geo. 2 |
|---|---|---|---|
| 1 | New York City | 6M | Los Angeles |
| 2 | Chicago | 1.5M | Dallas |
| 3 | Houston | 1M | Washington |
| 4 | Miami | 0.4M | Philadelphia |
| 5 | Atlanta | 2M | Boston |
| ... | ... | ... | ... |
| 40 | Madison | 0.1M | Honolulu |

At block 235, the one or more processing circuits can extract, from the data, evaluation data associated with a second time interval. In some implementations, the evaluation data may be extracted from the received data corresponding to the plurality of geographic regions. In some implementations, extracting the evaluation data may be performed by the data preparation system 112. Extracting may include analyze and crawling through (i.e., data crawling) the data corresponding to the plurality of geographic regions to determine what response data and input data corresponds to the second time interval.

At block 240, the one or more processing circuits can separate the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate. In various implementations, for each simulation, the first geographic region may be the treatment region and the second geographic region may be the control region. In various implementations, the first geographic region associated with the treatment subset and the second geographic region associated with the control subset is randomly selected from the geographic regions of each geographic pair. That is, a randomized algorithm that employs a degree of randomness may be utilized to randomly select the treatment and control regions. For example, the randomized algorithm may use uniformly random bits as an auxiliary input to guide the randomness. In some examples, one or more processing circuits may observe outside sources (e.g., data sources, user device selections) that are not predictable to guide the randomness.

In various implementations, each different simulation subsets can include a plurality of simulations (e.g., 100, 1000, 10000, etc.), where each simulation can contain a different combination of treatment and control geos. In some implementations, each different simulation subset can be associated with a different subset of geographic pairs. For example, each simulation subset may include one thousand simulation for a subset of forty geographic pairs. In this example, each simulation of the simulation subset may generate an outcome estimate that estimates the iROCI (i.e., estimated iROCI) with respect to each geo g. For example, the table below with reference to the above example tables, given a target iROCI of six (e.g., 6.00), illustrates a simulation subset associated with a number of geo pairs and a plurality of outcome estimate (Table 8):

| Simulation Subset | # of Geo Pairs | Outcome Estimates (k = 1000) |
|---|---|---|
| 1 | 40 | 4.31, 6.85, −0.63, . . . , k |
| 2 | 35 | 5.12, 7.21, 8.97, . . . , k |
| 3 | 30 | 4.50, 6.29, 1.37, . . . , k |
| 4 | 25 | 5.67, 5.29, 6.46, . . . , k |
| 5 | 20 | 5.77, 6.52, 6.14, . . . , k |
| 6 | 15 | 4.12, 6.28, 5.04, . . . , k | where k is the number of simulations performed for each simulation subset.

At block 245, the one or more processing circuits can calculate a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs. Accordingly, Equation 15, as described above, can be utilizing by the one or more processing circuits to calculate a plurality of uncertainty estimates.

At blocks 250 and 255, the one or more processing circuits can a first subset of geographic pairs of the plurality of different subsets of geographic pairs based on the uncertainty estimate and provide the selected subset of geographic pairs. That is, the first subset of geographic pairs can be provided to the experimental analysis system. In various implementations, the selection of the uncertainty estimate may be based on one or more conditions (e.g., a prespecified value, mathematical relationships (e.g., minimization, maximization) and/or the number of geographic pairs of the first plurality of geographic pairs). That is, the input parameters may include a prespecified value that can dictate a limit associated with an inequality (e.g., greater than, less than, equal to, or combination of the three) for an uncertainty estimate. In other implementations, the prespecified value may be determined by the one or more processing circuits (or at least in part determined by the one or more processing circuits). That is, the one or more processing circuits could determine a prespecified value based on historical experimental data (e.g., response data, input data, geo experiments), data from other sources (e.g., data sources 160 in FIG. 1, content database 172 in FIG. 1), randomization, designation by a content provider (i.e., input parameters), a mathematical formula, and/or a machine learning algorithm. Further, the number of geographic pairs can also dictate a limit associated with an inequality (e.g., greater than, less than, equal to, or combination of the three) for the number of geographic pairs in the selected first subset of geographic pairs. In one example, the prespecified value could be a value less than two (e.g., 2.0>uncertainty estimate) such that the uncertainty estimate of the plurality of uncertainty estimates that is closest and less than two would be selected by the one or more processing circuits. In another example, the number of geographic pairs of the first subset of geographic pairs could be a number greater than eight (e.g., # of geo pairs>8). In various implementations, the prespecified value and number of geographic pairs can be utilized in combination, by the one or more processing circuits, to select the first subset of geographic pairs. For example, the prespecified value could be a value less than one but greater than one half (e.g., 1.0>uncertainty estimate>0.5) and the number of geographic pairs of the first subset of geographic pairs could be a number less than or equal to twenty (e.g., 20≥# of geo pairs). Thus, in this example, the one or more processing circuits selection of the first subset of geographic pairs of the plurality of different subsets of geographic pairs may satisfy both the prespecified value and number of geographic pairs conditions. For example, the table below with reference to the above example tables, illustrates 6 different subsets of geographic pairs with their respective uncertainty estimates (Table 9):

| Simulation Subset | # of Geo Pairs | Uncertainty Estimate |
|---|---|---|
| 1 | 40 | 2.91 |
| 2 | 35 | 1.55 |
| 3 | 30 | 1.19 |
| 4 | 25 | 1.08 |
| 5 | 20 | 0.87 |
| 6 | 15 | 0.96 |

As illustrated above, the uncertainty estimate could decrease as the number of geo pairs decreases. In other examples, this relationship may not be the illustrated (e.g., uncertainty could increase as the number of geo pairs decrease). However, in the illustrative table shown above, the one or more processing circuits can select a first subset of geographic pairs of the plurality of different subsets of geographic pairs based on the uncertainty estimates and provide the selected subset of geographic pairs. For example, the one or more processing circuits may select the smallest uncertainty estimate, simulation subset 5. In another example, the one or more processing circuits may select the uncertainty estimate closest to one, simulation subset 6. In some implementations, the selection of the uncertainty estimate may be further based a prespecified value, mathematical relationships (e.g., minimization, maximization) and/or the number of geographic pairs of the first plurality of geographic pairs. In one example, the prespecified value may be a value less than one half (e.g., 0.5>uncertainty estimate) such that the uncertainty estimate of the plurality of uncertainty estimates that is closest and less than one half would be selected by the one or more processing circuits. In this example, subset 6 would be selected and provided to an experimental analysis system (e.g., experimental analysis system 114 in FIG. 1) and/or any other system described herein. In some arrangements, the selected subset of geographic pairs can be stored in a database (e.g., analysis database 120 in FIG. 1, and in particular, geographic dataset 122).

In various implementations, method 200 can also include the one or more processing circuits calculating a plurality of outcome estimates based on a difference in response data and a difference in input data of the evaluation data for each of the plurality of different subset of geographic pairs (described at block 445). In some implementations, the outcome estimate may be about an outcome estimate prespecified value. The outcome estimate prespecified value may be based on input from a content provider or entity. In various implementations, the outcome estimate prespecified value may be based on pre-test data (e.g., pre-geo experiment data). For example, the outcome estimate prespecified value may be zero, such that the outcome estimate that is closest to zero may indicate the geo pairs in a subset of geographic pairs of the plurality of different subsets of geographic pairs may be well-matched. In one example, it can be assumed that there are 5 geographic pairs in a dataset of geographic pairs and the outcome estimate prespecified value is zero. The table below illustrates the 5 geographic pairs and evaluation data associated with each geographic pair (Table 10):

| Geo Pairs | $R_{it}$ | $R_{ic}$ | $S_{it}$ | $S_{ic}$ | $Y_i = R_{it} - R_{ic}$ | $X_i = S_{it} - S_{ic}$ |
|---|---|---|---|---|---|---|
| 1 | 98 | 100 | 2 | 1 | −2 | 1 |
| 2 | 138 | 20 | 4 | 2 | 18 | 2 |
| 3 | 174 | 130 | 6 | 3 | 44 | 3 |

-continued

| Geo Pairs | $R_{it}$ | $R_{ic}$ | $S_{it}$ | $S_{ic}$ | $Y_i = R_{it} - R_{ic}$ | $X_i = S_{it} - S_{ic}$ |
|---|---|---|---|---|---|---|
| 4 | 300 | 500 | 10 | 10 | −200 | 0 |
| 5 | 1000 | 601 | 20 | 19 | 399 | 1 |

The notation is denoted as follows:

$R_{ic}$, $S_{ic}$: Response and content input of evaluation data for control region $R_{it}$, $S_{it}$: Response and content input of evaluation data for treatment region $Y_i = R_{it} - R_{ic}$: Difference in the responses of evaluation data $X_i = S_{it} - S_{ic}$: Difference in content input of evaluation data $\epsilon_i(\theta) = Y_i - X_i\theta$: Difference in response background noise with respect to θ, where response background noise can include the difference of potential outcomes between the treatment geo and the control geo Since the outcome estimate prespecified value is zero, θ can be solved utilizing a subset of geographic pairs to determine a plurality of outcome estimates. An outcome estimate with a subset of geographic pairs that includes all the geo pairs, is shown below (i.e., trim rate=0/5=0):

$$\text{Trimmed mean}\{\epsilon_i(\theta)\} = 0$$

$$\text{Trimmed mean}\{\epsilon_i(\theta): 1, 2, \ldots 5\} = 0$$

If trim rate=0, the trimmed mean statistic can have an expected value of 0 (i.e., the average):

$$0 = \text{mean}(Y_i) - \text{mean}(X_i) * \theta$$

$$\text{mean}(X_i) * \theta = \text{mean}(Y_i)$$

$$\theta = \frac{\text{mean}(Y_i)}{\text{mean}(X_i)}$$

$$\theta = \frac{-2 + 18 + 44 - 200 + 399}{1 + 2 + 3 + 0 + 1}$$

$$\theta = \frac{259}{7} = 37$$

| Geo Pairs | $\epsilon_i(\theta) = Y_i - X_i\theta$ | $\epsilon_i(\theta)$ |
|---|---|---|
| 1 | $\epsilon_i(\theta) = -2 - (37 * 1)$ | −39 |
| 2 | $\epsilon_i(\theta) = 18 - (37 * 2)$ | −56 |
| 3 | $\epsilon_i(\theta) = 44 - (37 * 3)$ | −67 |
| 4 | $\epsilon_i(\theta) = -200 - (37 * 0)$ | −200 |
| 5 | $\epsilon_i(\theta) = 399 - (37 * 1)$ | 362 |

An outcome estimate with a subset of geographic pairs that includes geo pairs 1, 2, and 3, is shown below (i.e., trim rate=1/5=0.2):

$$\theta = \frac{\text{mean}(\text{untrimmed } Y_i)}{\text{mean}(\text{untrimmed } X_i)}$$

$$\theta = \frac{-2 + 18 + 44}{1 + 2 + 3}$$

$$\theta = \frac{60}{6} = 10$$

| Geo Pairs | $\epsilon_i(\theta) = Y_i - X_i\theta$ | $\epsilon_i(\theta)$ |
|---|---|---|
| 1 | $\epsilon_i(\theta) = -2 - (10 * 1)$ | −12 |
| 2 | $\epsilon_i(\theta) = 18 - (10 * 2)$ | −2 |
| 3 | $\epsilon_i(\theta) = 44 - (10 * 3)$ | 14 |

Other subsets of geographic pairs can also be utilized to calculate one or more outcome estimates. In various implementations, the outcome estimates can be used as input into the root mean square equation (RMSE). The RMSE calculation is described in detail with reference to FIGS. 1 and 3.

In some implementations, method 200 can include various alternatives. For example, instead of calculating a difference in input data and a difference a difference in input data and a difference in response data of the training data for each geographic region of the plurality of geographic regions, method 200 could analyze the evaluation data to determine similar characteristics (e.g., content provider visits, content provider store size in square feet, population of the geos, distance between each geo, and so on). In this example, the geo could be subsequently paired based on the determined similar characteristic. In another example, the geo pairs may not be determined until the outcome estimates have been generated. In this example, the one or more processing circuits may separate, by the one or more processing circuits, the geographic regions into a treatment region or a control region for a plurality of simulations of a plurality of different simulation subsets for each of a plurality of different subsets of geographic regions, wherein each simulation generates an outcome estimate. Further, in this example, the geos may be subsequently paired based on performing a plurality of simulation of a plurality of different simulation subsets for each of a plurality of different subsets of geographic regions.

In other examples, instead of one or more processing circuits performing blocks 220-230, the one or more processing circuits could perform blocks 210-215, block 235-240 on geographic regions (instead of pairs), and then perform the pairing of the geographic pairs based on the simulations, and conclude by performing blocks 245-255. That is, the one or more processing circuits could calculate a plurality of uncertainty estimates (similar to block 245) after extracting the evaluation data and performing simulations on geographic regions. Accordingly, the method implementation can vary based on different factors.

Figure 3:
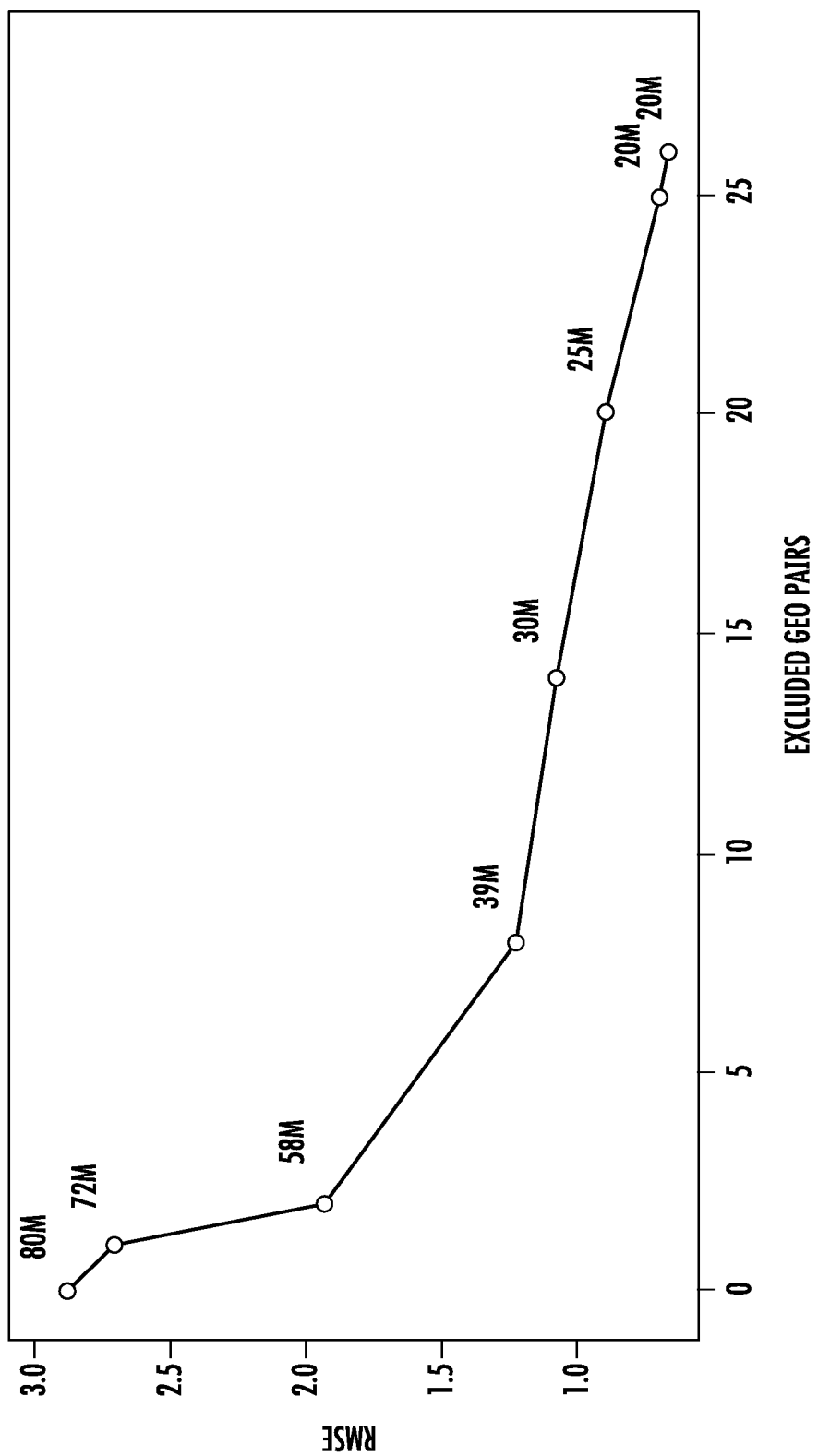
FIG. 3 is a chart of a plurality of uncertainty estimates in connection with the analysis system of FIG. 1, according to some arrangements.

Referring now to FIG. 3, chart 300 illustrate a plurality of uncertainty estimates in connection with the analysis system of FIG. 1 as shown, according to an illustrative implementation. As shown, the RMSE value is the x-axis and the number of excluded geo pairs is the y-axis. Chart 300 illustrates a relationship between the number of excluded geo pairs and the RMSE value. Generally, Root Mean Square Error (RMSE) is the standard deviation of the residuals (prediction errors). Residuals can be a measure of how far from the regression line data points are; RMSE can be a measure of how spread out the residuals are. That is, it can indicate how concentrated the data is around the line of best fit (e.g., target iROCI). That is, as shown in chart 300, the greater number of geo pairs excluded could provide a smaller RMSE value (however that relationship may vary). That statistical analysis can provide an RMSE value for a subset of geo pairs (with reference to Equation 15 above):

$$RMSE(\hat{\theta}) = \sqrt{\frac{1}{K}\sum_{k=1}^{K}\left(\hat{\theta}^{(k)} - \theta^*\right)^2}$$

where θ* is an observed value (e.g., target iROCI), and $\hat{\theta}^{(k)}$ are predicted values (e.g., estimated iROCI) and k is the number of observations (e.g., simulations).

Figure 4:
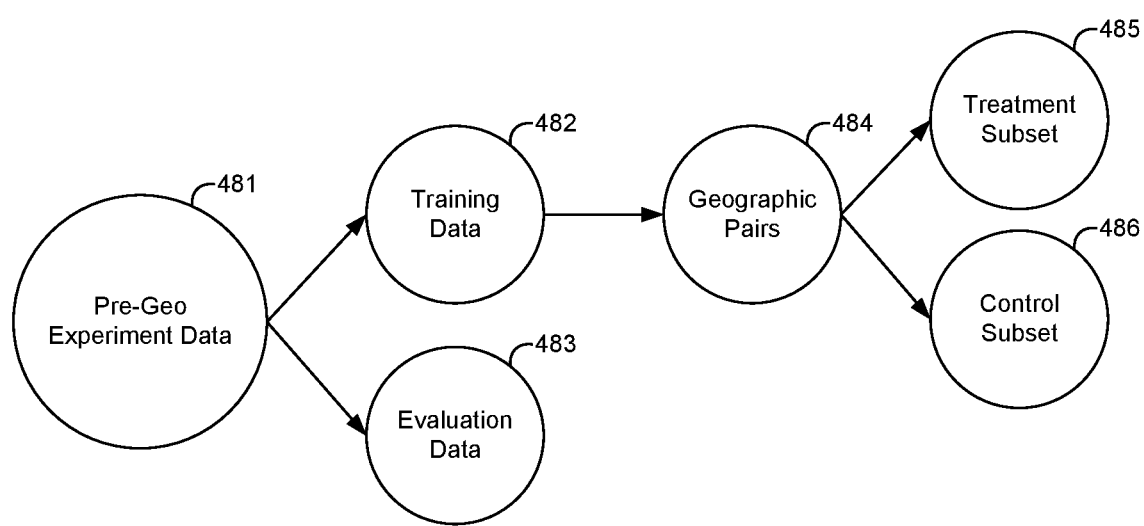
FIG. 4 is a block diagram illustrating pre-geo experiment data in connection with the analysis system of FIG. 1, according to an illustrative implementation.

Referring now to FIG. 4, a block diagram illustrating pre-geo experiment data 481 in connection with the analysis system of FIG. 1 as shown, according to an illustrative implementation. In some implementations, the pre-geo experiment data 481 can extracted and utilized by the analysis system 110 of FIG. 1 (e.g., data preparation system 112 and modeler 116) to prepare data and design geo experiments. In some implementations, the pre-geo experiment data 481 can be split into two sets of data. As shown, the first set can be the training data 482 and the second set can be the evaluation data 483. In some implementations, training data 482 can include response data and input data associated with a first time interval (also referred to herein as "a predefined period of time"). In various implementations, evaluation data 483 can include response data and input data associated with a second time interval (also referred to herein as "a different predefined period of time"). The response data can be a result of an action associated with the input data. That is, the response data may indicate particular amounts of revenue at particular times. In some embodiments, the response is number of conversions, number of sales, number of account registrations, etc. at particular times. The input data may indicate particular amounts (e.g., fiat currency) of content input for the content type at particular times. The input data may further indicate a number of content runs at particular times.

In some implementations, the evaluation data 483 may be a subset of the training data 482 such that the second time interval is within the first time interval. For example, the evaluation data 483 may be response data and input data associated with May 2019, whereas the training data 482 may be response data and input data associated with the year 2019. Further, the response data and input data of the evaluation data 483 can be included in the response data and input data of the training data 482. That is, the training data 482 can include response data and input data from May 2019 but also includes all the other months of year 2019, whereas the evaluation data 483 may only include response data and input data from May 2019. In other implementations, the evaluation data 483 may be data that is different than in the training data 482 such that the second time interval is not within the first time interval. For example, the evaluation data 483 may be response data and input data associated with June 2025, whereas the training data 482 may be response data and input data associated with the years 2022-2024. Accordingly, the response data and input data of the evaluation data 483 would be different and not be included in the response data and input data of the training data 482.

In various implementations, each of the response data and input data for both the training data 482 and evaluation data 483 may be associated with a particular period of time. That is, the response data and input data may be categorized/grouped by a particular period of time (e.g., time interval). For example, the response data and input data may be grouped by months of a particular year. In another example, the response data and input data may be grouped by days of a particular month. In yet another example, the response data and input data may be grouped by minutes of a day. Both the training data 482 and evaluation data 483 are explained in further detail with reference to FIGS. 1-2.

In various implementations, the training data 482 can be utilized to generate geographic pairs 484. For example, the training data 482 may include data associated with 50 geographic regions, each geographic region including response data and input data about the specific geographic region. In this example, the 50 geographic regions could be paired into 25 geographic pairs. The pairing process is described in detail with reference to FIGS. 1-2. In some implementations, the geographic pairs 484 can be split into two subsets of data. As shown, the first set can be a treatment subset 485 and the second set can be a control subset 486. Both the treatment subset 485 and control subset 486 are explained in detail with reference to FIGS. 1-2. For example, with reference to the above example, each of the 25 geographic pairs may be split into a treatment region and a control region. The splitting of geographic pairs into treatment and control is described in detail with reference to FIGS. 1-2.

Figure 5:
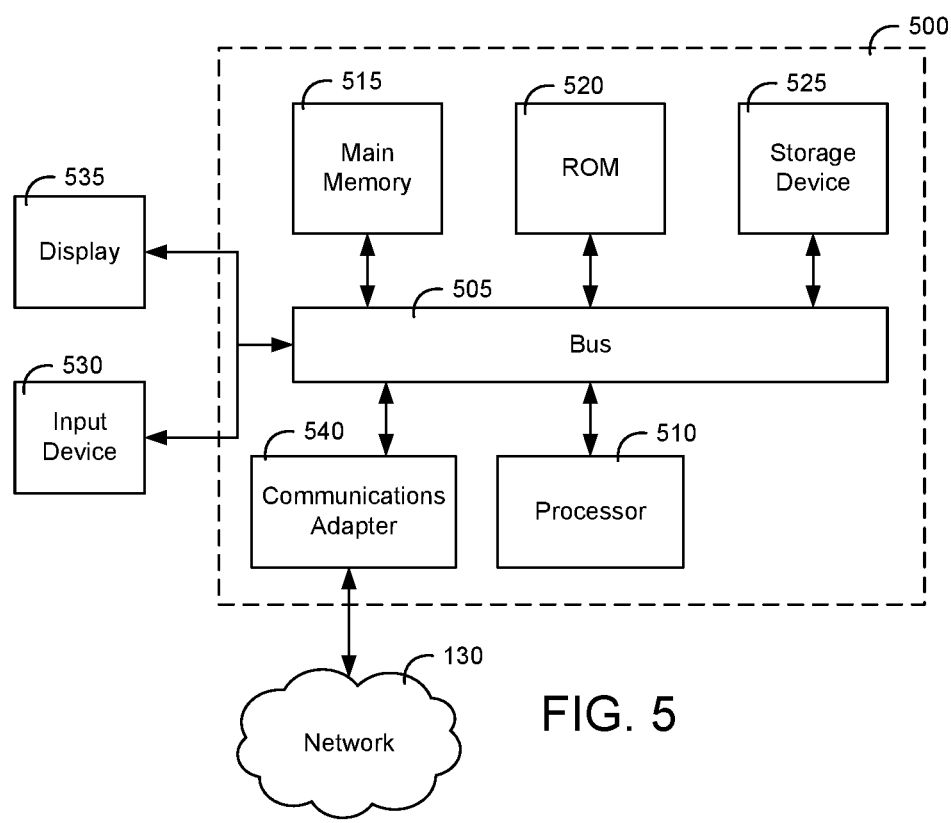
FIG. 5 is a block diagram of a computing system, according to an illustrative implementation.

FIG. 5 illustrates a depiction of a computer system 500 that can be used, for example, to implement an illustrative user device 140, an illustrative content provider device 150, an illustrative analysis system 110, and/or various other illustrative systems described in the present disclosure. The computing system 500 includes a bus 505 or other communication component for communicating information and a processor 510 coupled to the bus 505 for processing information. The computing system 500 also includes main memory 515, such as a random-access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid-state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information, and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

In some implementations, the computing system 500 may include a communications adapter 540, such as a networking adapter. Communications adapter 540 may be coupled to bus 505 and may be configured to enable communications with a computing or communications network 130 and/or other computing systems. In various illustrative implementations, any type of networking configuration may be achieved using communications adapter 540, such as wired (e.g., via Ethernet), wireless (e.g., via WiFi, Bluetooth, etc.), pre-configured, ad-hoc, LAN, WAN, etc.

According to various implementations, the processes that effectuate illustrative implementations that are described herein can be achieved by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

Although an example processing system has been described in FIG. 5, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be carried out using digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer-readable storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be carried out using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be carried out using a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks, distributed ledger networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some illustrative implementations, the features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TELEVISION channel, on a satellite TELEVISION channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, Disney+, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a smart watch, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be carried out in combination or in a single implementation. Conversely, various features that are described in the context of a single implementation can also be carried out in multiple implementations, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination. Additionally, features described with respect to particular headings may be utilized with respect to and/or in combination with illustrative implementations described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of preparing datasets for geo experiments, comprising:
   receiving, by one or more processing circuits, one or more input parameters associated with a geo experiment for an entity;
   receiving, by the one or more processing circuits, data corresponding to a plurality of geographic regions, the data comprising input data, response data, and location identifiers associated with each geographic region, wherein the response data is a result of an action associated with the input data;
   extracting, from the data corresponding to the plurality of geographic regions, by the one or more processing circuits, training data associated with a first time interval;
   calculating, by the one or more processing circuits, a difference in input data and a difference in response data of the training data for each geographic region of the plurality of geographic regions;

determining, by the one or more processing circuits, a first plurality of geographic pairs based on the difference in response data and the difference in input data of the training data for each geographic region of the plurality of geographic regions;

extracting, from the data corresponding to the plurality of geographic regions, evaluation data associated with a second time interval;

separating, by the one or more processing circuits, the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate;

calculating, by the one or more processing circuits, a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs;

selecting, by the one or more processing circuits, a first subset of geographic pairs of the plurality of different subsets of geographic pairs based on the uncertainty estimates; and providing, by the one or more processing circuits, the selected subset of geographic pairs.

2. The method of claim 1, wherein generating an outcome estimate is based on calculating the difference in response data and the difference in input data of the evaluation data.

3. The method of claim 1, wherein calculating the plurality of uncertainty estimates further comprises calculating a root mean square error.

4. The method of claim 1, wherein the treatment region for the geographic regions of each geographic pair is associated with a first geographic region, and wherein the control region for the geographic regions of each geographic pair is associated with a second geographic region.

5. The method of claim 4, wherein the first geographic region associated with the treatment region and the second geographic region associated with the control region is randomly selected from the geographic regions of each geographic pair for each of the plurality of simulations.

6. The method of claim 4, wherein the first geographic region and the second geographic region are associated with a target population.

7. The method of claim 1, wherein the one or more input parameters comprises at least one of an experiment time interval, one or more geographic locations, a target estimate, and an input amount.

8. The method of claim 1, wherein the second time interval is smaller than the first time interval and is based at least on the one or more input parameters.

9. The method of claim 1, wherein the second time interval is in the first time interval, and wherein the evaluation data comprises both a subset of the response data and a subset of input data of the training data.

10. A system comprising:
at least one processing circuit configured to:
receive one or more input parameters associated with a geo experiment for an entity;
receive data corresponding to a plurality of geographic regions, the data comprising input data, response data, and location identifiers associated with each geographic region, wherein the response data is a result of an action associated with the input data;

extract, from the data corresponding to a plurality of geographic regions, training data associated with a first time interval;

calculate a difference in input data and a difference in response data of the training data for each geographic region of the plurality of geographic regions;

determine a first plurality of geographic pairs based on the difference in response data and the difference in input data of the training data for each geographic region of the plurality of geographic regions;

extract, from the data corresponding to a plurality of geographic regions, evaluation data associated with a second time interval;

separate the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate;

calculate a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs;

select a first subset of geographic pairs of the plurality of different subsets of geographic pairs based on the uncertainty estimates; and provide the selected subset of geographic pairs.

11. The system of claim 10, wherein generating an outcome estimate is based on calculating the difference in response data and the difference in input data of the evaluation data.

12. The system of claim 10, wherein calculating the plurality of uncertainty estimates further comprises calculating a root mean square error.

13. The system of claim 10, wherein the treatment region for the geographic regions of each geographic pair is associated with a first geographic region, and wherein the control region for the geographic regions of each geographic pair is associated with a second geographic region.

14. The system of claim 13, wherein the first geographic region associated with the treatment region and the second geographic region associated with the control region is randomly selected from the geographic regions of each geographic pair for each of the plurality of simulations.

15. The system of claim 13, wherein the first geographic region and the second geographic region are associated with a target population.

16. The system of claim 10, wherein the one or more input parameters comprises at least one of an experiment time interval, one or more geographic locations, a target estimate, and an input amount.

17. The system of claim 10, wherein the second time interval is smaller than the first time interval and is based at least on the one or more input parameters.

18. One or more non-transitory computer-readable storage media having instructions stored thereon that, when executed by at least one processing circuit, cause the at least one processing circuit to perform operations comprising:
receiving one or more input parameters associated with a geo experiment for an entity;

receiving data corresponding to a plurality of geographic regions, the data comprising input data, response data, and location identifiers associated with each geographic region, wherein the response data is a result of an action associated with the input data;

extracting, from the data corresponding to a plurality of geographic regions, training data associated with a first time interval;

calculating a difference in input data and a difference in response data of the training data for each geographic region of the plurality of geographic regions;

determining a first plurality of geographic pairs based on the difference in response data and the difference in input data of the training data for each geographic region of the plurality of geographic regions;

extracting, from the data corresponding to a plurality of geographic regions, evaluation data associated with a second time interval;

separating the geographic regions of each geographic pair of the first plurality of geographic pairs into a treatment region or a control region for a plurality of simulations of a plurality of different simulation subsets for each of a plurality of different subsets of geographic pairs, wherein each simulation generates an outcome estimate;

calculating a plurality of uncertainty estimates based on the plurality of different simulation subsets for each of the plurality of different subsets of geographic pairs and the one or more input parameters, wherein each uncertainty estimate comprises a different subset of geographic pairs, and wherein each subset of geographic pairs comprises a different number of geographic pairs;

selecting a first subset of geographic pairs of the plurality of different subsets of geographic pairs based on the uncertainty estimates; and providing the selected subset of geographic pairs.

19. The one or more non-transitory computer-readable storage media of claim 18, wherein calculating the plurality of uncertainty estimates based on the evaluation data for each of the plurality of different subsets of geographic pairs further comprises calculating a plurality of outcome estimates based on a difference in response data and a difference in input data of the evaluation data for each of the plurality of different subsets of geographic pairs.

20. The one or more non-transitory computer-readable storage media of claim 18, wherein calculating the plurality of uncertainty estimates further comprises calculating a root mean square error of each of the plurality of outcome estimates.

* * * * *